United States Patent [19]

Tielemans et al.

[11] Patent Number: 4,678,348

[45] Date of Patent: Jul. 7, 1987

[54] RADIAL SPIRAL-GROOVE BEARING

[75] Inventors: Leonardus P. M. Tielemans, Eindhoven; Franciscus M. J. Van Roemburg, Drachten, both of Netherlands

[73] Assignee: U.S. Philips Corporation, New York, N.Y.

[21] Appl. No.: 856,914

[22] Filed: Apr. 28, 1986

[30] Foreign Application Priority Data

May 17, 1985 [NL] Netherlands ............... 8501423

[51] Int. Cl.$^4$ ............ F16C 32/06; F16C 33/10
[52] U.S. Cl. .................. 384/114; 384/115; 384/120; 384/292
[58] Field of Search ........... 384/100, 108, 115, 118, 384/120, 378, 397, 283, 292

[56] References Cited

U.S. PATENT DOCUMENTS

| | | | |
|---|---|---|---|
| 627,985 | 7/1899 | Delano | 384/292 |
| 3,602,555 | 8/1969 | Hendler | 384/115 |
| 4,120,544 | 10/1978 | Hüber | 384/292 |
| 4,141,603 | 2/1979 | Remmers et al. | 384/108 |
| 4,596,474 | 6/1986 | Van Roemburg | 384/115 |

Primary Examiner—Stuart S. Levy
Assistant Examiner—Thomas R. Hannon
Attorney, Agent, or Firm—David R. Treacy

[57] ABSTRACT

A radial bearing comprising a cylindrical bearing member and a shaft arranged therein, the member and the shaft being rotatable with respect to each other and one of the cooperating bearing surfaces of the member and the shaft being provided with a pattern of shallow lubricant-pumping grooves which, during relative rotation between the member and the shaft, build up a pressure in a lubricant present between the shaft and the member. In one axial zone of the member or the shaft the relevant bearing surface is provided along one half of its circumference with a groove pattern which is arranged to pump in one circumferential direction, and along the other half of its circumference with an identical groove pattern which is arranged to pump in the opposite circumferential direction.

4 Claims, 5 Drawing Figures

RADIAL SPIRAL-GROOVE BEARING

BACKGROUND OF THE INVENTION

The invention relates to a radial bearing comprising a cylindrical bearing outer member and a shaft arranged therein, the member and the shaft being rotatable with respect to each other. One of the cooperating bearing surfaces of the member and the shaft are provided with a pattern of shallow lubricant-pumping grooves which, during relative rotation between the member and the shaft, build up a pressure in a lubricant present between the shaft and the member.

A radial bearing of the kind described above is described in the Netherlands Patent Application No. 7609817 laid open to public inspection, to which U.S. Pat. No. 4,141,603 corresponds. In this known bearing, the shaft or the outer member is provided with at least three patterns of shallow lubricant-pumping grooves located in successive axial zones, the two outer patterns having grooves which exert their pumping effect in the same direction and the intermediate pattern having grooves pumping in the opposite direction. The result of this is that upon rotation of the shaft in one direction a pressure is built up in the lubricant present at the area of one outer pattern of grooves and the inner pattern of grooves, while upon rotation in the opposite direction a pressure is built up in the lubricant present at the area of the other outer pattern of grooves and the inner pattern of grooves. Thus, the bearing operates both upon rotation in one direction and upon rotation in the other direction.

A disadvantage of this known bearing is that with the different directions of rotation disturbing tilting moments occur in such a bearing. This is due to the fact that in one direction of rotation journalling takes place in one axial zone and in the other direction of rotation journalling takes place in another axial zone. Especially with self-adjusting bearings and more particularly with relatively heavily loaded bearings, patterns of grooves of the kind mentioned herein before cannot be used.

SUMMARY OF THE INVENTION

The invention has for its object to provide a bearing of the kind mentioned in the opening paragraph, which is suitable for two directions of rotation and in which disturbing tilting moments do not occur.

The radial bearing according to the invention is characterized in that in an axial zone of the shaft or the member the relevant bearing surface is provided along one half of its circumference with a pattern of grooves which is arranged to pump in one circumferential direction, and along the other half of its circumference with an identical pattern of grooves which is arranged to pump in the opposite circumferential direction. Thus, a bearing is obtained in which both upon rotation in one direction and upon rotation in the other direction a pressure is built up in the lubricant, in the same axial zone, so that a varying tilting moment does not occur. In this configuration of the patterns of grooves, however, it has to be ensured that the load vector has a constant direction with respect to the patterns of grooves. This means that with a rotating load (imbalance) the patterns of grooves have to be formed in the shaft, and with a load vector which always has the same direction the patterns of grooves have to be formed in the member.

In a further embodiment of the bearing according to the invention, the grooves of the two patterns are so formed that the bottoms of the grooves extend eccentrically about the axis of the bearing so that the depth of each grooves varies gradually from a maximum at the area where the patterns adjoin each other along one axially extending side of each pattern, to a minimum at the area where the patterns of grooves adjoin each other along the other axially extending side.

Thus, extremely high loads can be transferred by means of a lubrication film formed hydrodynamically. The grooves in the bearing surfaces mainly serve as supply grooves for the lubricant, while in the substantially smooth (ungrooved) bearing part an optimum lubrication film is formed by means of the wedge effect. This film keeps the shaft and the member separated from each other.

A further embodiment of the bearing is characterized in that the groove patterns are each bounded at their two axially spaced ends by a lubricant-collecting groove provided in the shaft or in the member. Lubricant is pumped into the latter grooves from the bearing gap over one half of the circumference, while lubricant is pumped along the other half of the circumference from these grooves into the bearing gap, in which a pressure is then built up.

The invention will be described more fully with reference to the drawings.

BRIEF DESCRIPTION OF THE INVENTION

DESCRIPTION OF THE PREFERRED EMBODIMENTS

Figure 1:
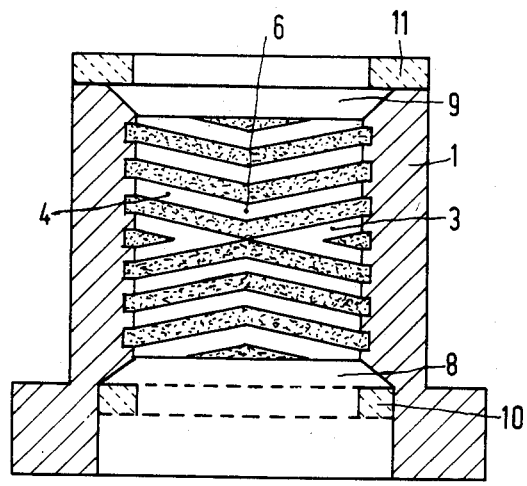
FIGS. 1 and 2 show in axial sectional view and in end elevation a radial bearing suitable for two directions of rotation, the bearing being provided with grooves having the same depth throughout their length.
Figure 2:
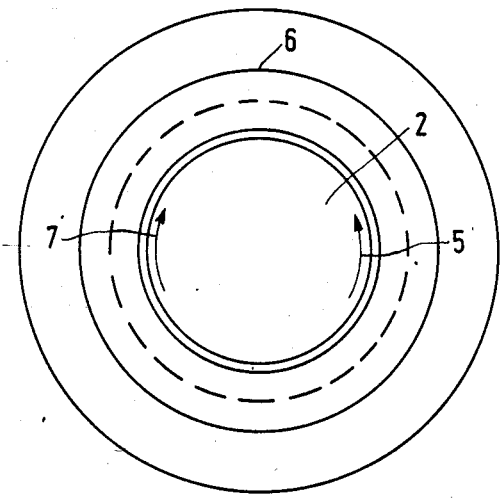

In FIGS. 1 and 2, reference numeral 1 designates a bearing member in which a shaft 2 can be rotatably journalled. For the sake of clarity, the shaft is omitted from FIG. 1. The bearing member 1 is provided at its inner circumference with two patterns of helically extending grooves 3 and 4, the pattern 3 extending along the righthand half of the circumference, as viewed in the drawings, and the pattern 4 extending along the left-hand half thereof.

When the shaft 2 rotates in the direction indicated by the arrow 5, (FIG. 2), lubricant will be pumped in the groove pattern 3 towards the area 6 of the circumference of the bearing member. Upon rotation of the shaft 2 in the other direction indicated by the arrow 7, lubricant will be pumped through the grooves of the pattern 4 towards the area 6. In both directions of rotation, the bearing gap between the member 1 and the shaft 2 will consequently always be filled at 6 with lubricant under pressure. It is assumed that the load vector is directed constantly towards the area 6. To collect lubricant the patterns 3 and 4 are each bounded at their two axially spaced ends by grooves 8 and 9, respectively. The grooves 8 and 9 are bounded at their sides remote from the groove patterns by rings 10 and 11, respectively. The rings 10 and 11 under certain circumstances may also form part of the bearing member 1. Upon rotation of the shaft 2, lubricant from the store of lubricant in the grooves 8 and 9 is drawn along one half of the inner circumference of the member into one groove pattern and is pumped back into the grooves 8 and 9 along the other half of the circumference through the other groove pattern. Upon reversal of the direction of rotation of the shaft, the latter situation also changes.

Figure 4:
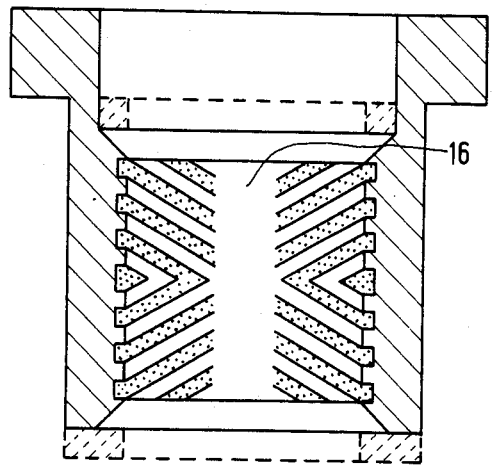
FIGS. 3, 4 and 5 show in a transverse sectional view and in two axial sectional views, respectively, taken on the lines IV—IV and V—V, respectively, a radial bearing suitable for two directions of rotation, the bearing being provided with grooves of varying depth.
Figure 3:
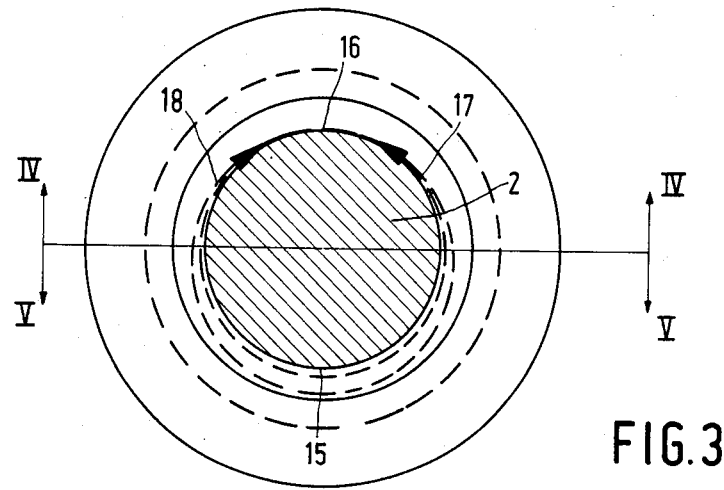
Figure 5:
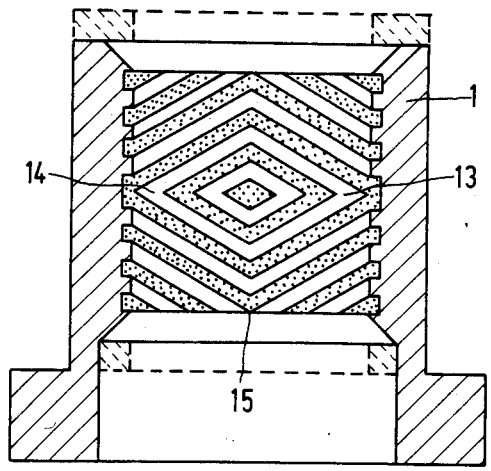

FIGS. 3, 4 and 5 show diagrammatically a radial bearing with a shaft 2 and a bearing member 1. The bearing member, as in the preceding embodiment, is provided with two patterns 13 and 14 of shallow lubricant-pumping grooves. However, the grooves are now so formed that the bottoms of the grooves extend somewhat eccentrically about the axis of the bearing so that the depth of each groove varies gradually from a maximum at 15 where the two groove patterns adjoin each other along one axially extending location at the circumferential end of each pattern to a minimum, even approaching zero at 16 where the patterns are adjacent each other along the other axially extending side. The result of this is that upon rotation of the shaft 2 in the direction of the arrow 17, the groove pattern 13 pumps lubricant to the area 16 of the bearing gap and a high hydrodynamic pressure is built up in the lubricant there due to the wedge effect so that high loads can be absorbed. Upon rotation of the shaft 2 in the direction of the arrow 18, the groove pattern 14 pumps lubricant to the area 16. Thus, a spiral-groove radial bearing is obtained which ensures satisfactory journalling during rotation of the shaft in each of the two directions. However, in this case the loading should, of course, always be directed towards the area 16. In the case of a load vector following the rotation of the shaft, the groove patterns must therefore be provided not in the bearing member but on the shaft.

What is claimed is:

1. A radial bearing comprising a circular cylindrical outer bearing member and a shaft arranged therein, said member and shaft being rotatable with respect to each other about an axis and having cooperating bearing surfaces; and a supply of lubricant arranged between said surfaces, one of said surfaces having a plurality of cooperating patterns of shallow lubricant-pumping grooves arranged for building pressure in said lubricant during relative rotation, and at least two patterns in adjoining successive axial zones having opposite directions of helical angle to cause pumping in one direction of relative rotation, characterized in that said one surface has a circumference having first and second halves, the first half having two oppositely directed patterns of grooves in each of said adjoining successive axial zones for pumping lubricant in one direction of relative rotation, and the second half having two oppositely directed patterns of grooves in each of said adjoining successive axial zones for pumping lubricant in a direction of relative rotation opposite said one direction, the patterns of grooves in one half of one zone adjoining and communicating with the patterns of grooves in the other half at diametrically opposed locations.

2. A bearing as claimed in claim 1, characterized in that the plurality of cooperating patterns has two axially spaced ends bounding respective patterns, and a lubricant-collecting groove arranged at the corresponding end of one of said surfaces.

3. A radial bearing comprising a circular cylindrical outer bearing member and a shaft arranged therein, said member and shaft being rotatable with respect to each other about an axis and having cooperating bearing surfaces; and a supply of lubricant arranged between said surfaces, one of said surfaces having a plurality of cooperating patterns of shallow lubricant-pumping grooves arranged for building pressure in said lubricant during relative rotation, and at least two patterns in adjoining successive axial zones having opposite directions of helical angle to cause pumping in one direction of relative rotation, characterized in that said one surface has a circumference having first and second halves, the first half having two oppositely directed patterns of grooves in each of said adjoining successive axial zones for pumping lubricant in one direction of relative rotation, and the second half having two oppositely directed patterns of grooves in each of said adjoining successive axial zones for pumping lubricant in a direction of relative rotation opposite said one direction, the patterns of grooves in one half of one zone adjoining the patterns of grooves in the other half at an axially extending location, and the grooves of the patterns in each of said halves have bottoms extending eccentrically about said axis, arranged such that the depth of the grooves varies gradually from a maximum at said axially extending location to a minimum at a location where the respective groove patterns are adjacent each other at a location diametrically opposed said axially extending location.

4. A bearing as claimed in claim 3, characterized in that the plurality of cooperating patterns has two axially spaced ends bounding respective patterns, and a lubricant-collecting groove arranged at the corresponding end of one of said surfaces.

* * * * *